United States Patent
Neul et al.

(10) Patent No.: US 10,753,743 B2
(45) Date of Patent: Aug. 25, 2020

(54) MICROMECHANICAL YAW RATE SENSOR AND METHOD FOR THE PRODUCTION THEREOF

(71) Applicant: Robert Bosch GmbH, Stuttgart (DE)

(72) Inventors: Reinhard Neul, Stuttgart (DE); Torsten Ohms, Vaihingen/Enz-Aurich (DE); Robert Maul, Reutlingen (DE); Mirko Hattass, Stuttgart (DE); Christian Hoeppner, Stuttgart (DE); Odd-Axel Pruetz, Nuertingen (DE); Benjamin Schmidt, Stuttgart (DE); Rolf Scheben, Reutlingen (DE); Friedjof Heuck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 15/775,321

(22) PCT Filed: Nov. 10, 2016

(86) PCT No.: PCT/EP2016/077214
§ 371 (c)(1),
(2) Date: May 10, 2018

(87) PCT Pub. No.: WO2017/084950
PCT Pub. Date: May 26, 2017

(65) Prior Publication Data
US 2018/0321039 A1 Nov. 8, 2018

(30) Foreign Application Priority Data

Nov. 20, 2015 (DE) .......................... 10 2015 222 943
Jul. 28, 2016 (DE) .......................... 10 2016 213 870

(51) Int. Cl.
*G01C 19/5747* (2012.01)
*G01C 19/5712* (2012.01)

(52) U.S. Cl.
CPC ..... *G01C 19/5747* (2013.01); *G01C 19/5712* (2013.01)

(58) Field of Classification Search
None
See application file for complete search history.

(56) References Cited

U.S. PATENT DOCUMENTS

| 6,513,380 B2 * | 2/2003 | Reeds, III .......... | G01C 19/5719 73/504.04 |
| 2006/0156814 A1 * | 7/2006 | Blomqvist ......... | G01C 19/5712 73/504.12 |

(Continued)

FOREIGN PATENT DOCUMENTS

| DE | 199 37 747 A1 | 3/2001 |
| DE | 10 2009 027 897 A1 | 1/2011 |

(Continued)

OTHER PUBLICATIONS

International Search Report corresponding to PCT Application No. PCT/EP2016/077214, dated Mar. 6, 2017 (German and English language document) (5 pages).

*Primary Examiner* — Paul M. West
*Assistant Examiner* — Mark A Shabman
(74) *Attorney, Agent, or Firm* — Maginot, Moore & Beck LLP

(57) ABSTRACT

A micromechanical yaw rate sensor includes a substrate and a rotationally oscillating mass having a rotationally oscillating mass bearing. The rotationally oscillating mass bearing includes a rocker bar, a rocker spring rod which resiliently connects the rocker bar to the substrate, and two support spring rods which resiliently connect, on opposite sides of the rocker spring rod, the rocker bar to the rotationally oscillating mass.

11 Claims, 2 Drawing Sheets

(56) References Cited

U.S. PATENT DOCUMENTS

2010/0281977 A1* 11/2010 Coronato ........... G01C 19/5712
                                                    73/504.14
2014/0373628 A1   12/2014 Balslink et al.

FOREIGN PATENT DOCUMENTS

| DE | 10 2012 219 511 A1 | 4/2014 |
|----|---------------------|--------|
| JP | 2008-527318 A       | 7/2008 |
| JP | 2011-517781 A       | 6/2011 |
| WO | 97/02467 A1         | 1/1997 |
| WO | 00/19169 A1         | 4/2000 |

* cited by examiner

MICROMECHANICAL YAW RATE SENSOR AND METHOD FOR THE PRODUCTION THEREOF

This application is a 35 U.S.C. § 371 National Stage Application of PCT/EP2016/077214, filed on Nov. 10, 2016, which claims the benefit of priority to Serial Nos. DE 10 2015 222 943.2 filed on Nov. 20, 2015 and DE 10 2016 213 870.7 filed on Jul. 28, 2016 in Germany, the disclosures of which are incorporated herein by reference in their entirety.

The present disclosure relates to a micromechanical yaw rate sensor, in particular to a yaw rate sensor having a rotationally oscillating mass. From a further aspect, the disclosure relates to a method for producing such a micromechanical yaw rate sensor.

BACKGROUND

Micromechanical yaw rate sensors are used in the automobile sector, e.g. in ESP systems, for rollover sensing or for navigation purposes. The object of the yaw rate sensor is the correct measurement of the vehicle movement about an axis of rotation.

DE 10 2009 027 897 A1 discloses a micromechanical yaw rate sensor with a disk-shaped rotationally oscillating mass, which extends in the x-y plane defined by a chip substrate and which is caused to make a rotational oscillation about an axis of rotation perpendicular to said plane (z axis). The rotationally oscillating mass is connected via four springs to a hub. The springs are arranged in a circular central cut-out of the rotationally oscillating mass, into which the hub projects. The end of the hub that is directed counter to the rotationally oscillating mass is fixedly arranged on the substrate.

If, during a rotational movement of the oscillating body about the axis of oscillation, the yaw rate sensor experiences a rotation about a sensitive axis (e.g. x axis) of the yaw rate sensor, then Coriolis forces act on the axis of oscillation, which effect tilting of the oscillating body with respect to a surface of the substrate. The tilting of the rotationally oscillating mass can be detected capacitively with the aid of measuring electrodes and can be evaluated.

For reliable detection of the yaw rate, it is desirable with a low overall height to decouple the rotational oscillation transmitted to the rotationally oscillating mass by an oscillating drive from the tilting brought about by the Coriolis forces to the furthest possible extent.

SUMMARY

According to a first aspect, the present disclosure devises a micromechanical yaw rate sensor which has a rotationally oscillating mass with a rotationally oscillating mass bearing. The rotationally oscillating mass bearing comprises a rocker bar, a rocker spring rod, which resiliently connects the rocker bar to a substrate of the yaw rate sensor, and two support spring rods, which resiliently connect the rocker bar to the rotationally oscillating mass on opposite sides of the rocker spring rod.

According to a further aspect, the present disclosure devises a method for producing a micromechanical yaw rate sensor having a rotationally oscillating mass, which includes the formation of a rotationally oscillating mass bearing. The formation of the rotationally oscillating mass bearing comprises the steps: forming a rocker bar; resiliently connecting the rocker bar and a substrate of the yaw rate sensor by means of a rocker spring rod; and resiliently connecting the rocker bar and the rotationally oscillating mass by means of two support spring rods on opposite sides of the rocker spring rod.

The structure of the rotationally oscillating mass, with a compact design, permits a highly linear drive mode, in which interference modes (as a result of undesired oscillations transmitted by coupling from the drive to a detectable tilting of the rotationally oscillating mass) occur at frequencies which are substantially higher than the drive frequency, so that interference possibly superimposed on a detected tilting signal because of the interference modes can be prevented reliably by simple measures, such as low-pass filtering with a limiting frequency above the drive frequency.

According to a preferred development, the rocker spring rod extends at right angles to the rocker bar. This permits particularly reliable detection of the tilting of the rotationally oscillating mass by means of uniform driving of the oscillation with high amplitude.

According to a preferred development, the support spring rods are formed symmetrically on the opposite sides of the rocker spring rod. In this way, in the drive mode a particularly uniform harmonic rotational oscillation is made possible.

According to a preferred development, the support spring rods extend parallel to the rocker spring rod. This makes it possible to form the support spring rods in a same crystal direction of the substrate as the rocker spring rod, in order in this way to suppress coupling between the drive mode and the detection mode particularly reliably.

According to a preferred development, the yaw rate sensor also comprises a first drive mass, which is arranged beside the rotationally oscillating mass and is coupled to the rotationally oscillating mass via a first spring, and also a second drive mass, which is arranged beside the rotationally oscillating mass and is coupled to the rotationally oscillating mass via a second spring, wherein the rocker spring rod extends along a connecting straight line between the first and second spring. This permits a detection mode in which the rotationally oscillating mass tilts about the connecting straight line and, in the process, requires only minimal deformation of the rocker spring rod and the first and second spring. Thus, with effective decoupling from the drive mode, a particularly large deflection in the detection mode is made possible.

According to a preferred development, the rotationally oscillating mass bearing also comprises a further rocker bar, a further rocker spring rod, which resiliently connects the further rocker bar to the substrate of the yaw rate sensor, and two further support spring rods, which resiliently connect the further rocker bar to the rotationally oscillating mass on opposite sides of the further rocker spring rod. In this way, in the drive mode, a particularly stable, uniform and harmonic rotational oscillation is made possible, since the rotationally oscillating mass is supported by the rotationally oscillating mass bearing by means of more than one rocker bar. The rocker spring rod and the further rocker spring rod are preferably formed collinearly, e.g. in a symmetrical formation. This permits a detection mode in which the rotationally oscillating mass tilts about the straight line extending through the rocker spring rod and the further rocker spring rod and in the process requires only a minimal deformation of the two.

The rotationally oscillating mass preferably has a first projection and a second projection, which are formed in a cut-out in the rotationally oscillating mass, wherein, of the two support spring rods, one connects the rocker bar to the first projection, while the other support spring rod connects the rocker bar to the second projection, and, of the two further support spring rods, one connects the further rocker bar to the first projection, while the other further support spring rod connects the further rocker bar to the second projection. Amongst other things, this permits a particularly space-saving formation of the rotationally oscillating mass. Further preferably, the first and second projection are formed on mutually opposite sides of the cut-out, wherein the rocker spring rod connects the rocker bar and the further rocker spring rod connects the further rocker bar to the substrate of the yaw rate sensor between the first and second projection. This permits both the rocker bar and the further rocker bar to be connected to a common substrate anchoring point, functioning as a hub, in a particularly simple and space-saving manner.

DETAILED DESCRIPTION

Figure 1:
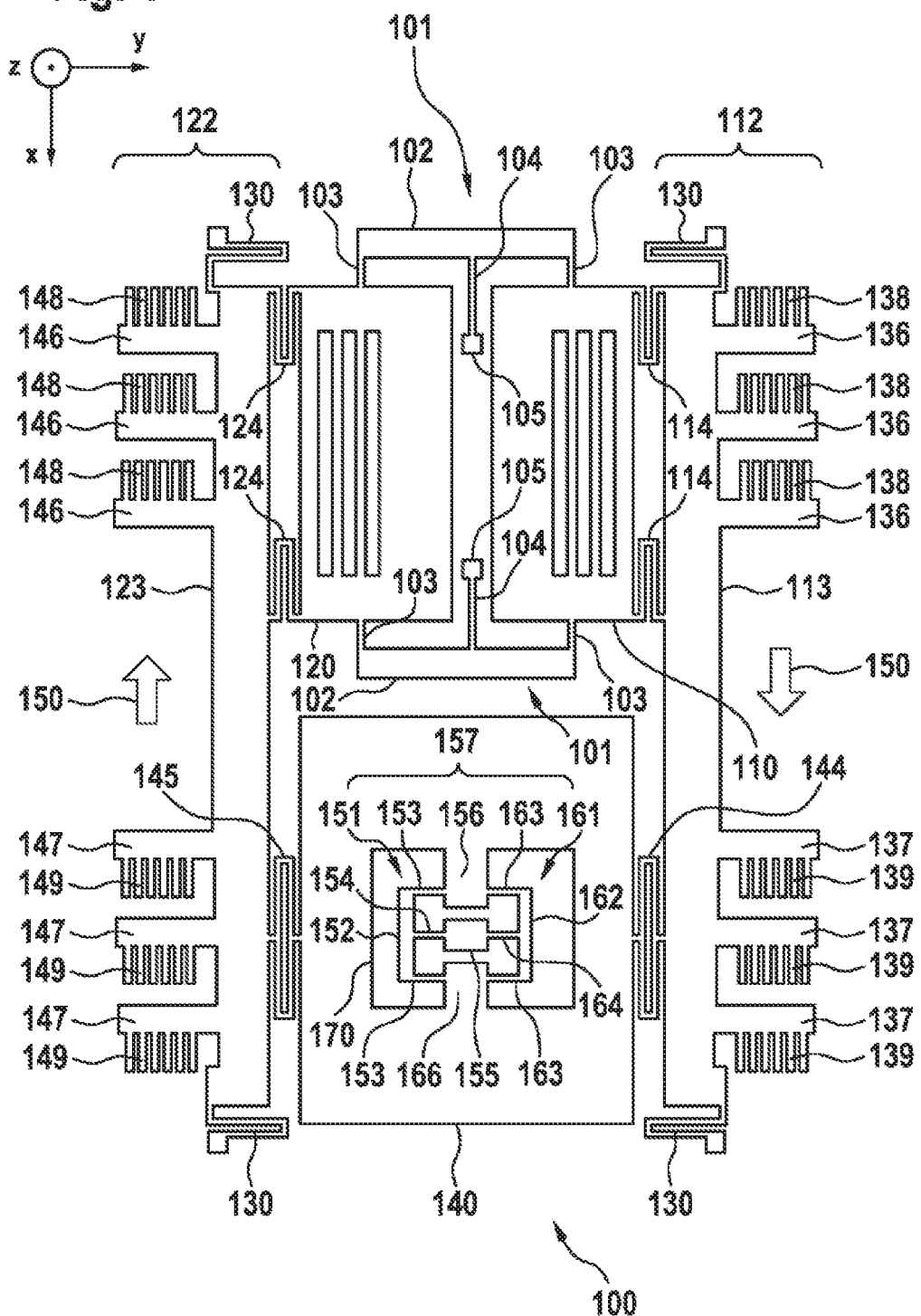
FIG. 1 shows a schematic plan view of a micromechanical yaw rate sensor according to one embodiment of the disclosure, stationary parts not being shown.

FIG. 1 shows a yaw rate sensor 100 according to an exemplary embodiment of the disclosure. FIG. 1 is a plan view of a substrate, not specifically illustrated, with a main extension plane (x-y plane), in which, between a first drive beam 113 and a second drive beam 123, a first Coriolis element 110, a second Coriolis element 120 and a rotationally oscillating mass 140 are arranged. As is indicated graphically in the top left corner of FIG. 1, in FIG. 1 the x direction points from top to bottom, the y direction from left to right and the z direction out of the plane of the drawing toward the viewer.

The first and second Coriolis element 110, 120 are formed as rectangular, frame-like structures of the same shape and size, which are oriented with their long sides parallel to the a direction and are arranged beside each other, so that a long side of the first Coriolis element 110 and a long side of the second Coriolis element 120 are opposite each other, spaced apart by a gap, the short sides of the Coriolis elements 110, 120 being aligned in parallel in pairs. The frame structure of the Coriolis elements 110, 120 results from the fact that, in the vicinity of the long sides that are turned away from each other, they each have a grid-like weight reduction area, in which cut-outs extending longitudinally and separated from one another only by thin webs are formed.

On the two pairs of their adjacent short sides that are aligned with one another, the Coriolis elements 110, 120 are coupled to one another by two mirror-symmetrical coupling elements 101 such that they can move. Each coupling element 101 comprises a rocker bar 102, which extends beside the first and second Coriolis element 110, 120, parallel to the mutually aligned short sides, in each case one end of the rocker bar 102 being opposite the center of a short side. At the two ends of its rocker bar 102, the coupling element 101 has a coupling spring rod 103 in each case, which resiliently connects the end of the rocker bar 102 over the shortest possible distance to the center of the opposite short side of the corresponding Coriolis element. Furthermore, the coupling element 101 has a rocker spring rod 104, which extends from the center of the rocker bar 102 that is opposite the gap between the Coriolis elements 110, 120, as far as a substrate anchoring point 105 placed in the gap, in order to resiliently connect the rocker 102 to the substrate.

The individual coupling elements 101 thus have overall the shape of an "E", the rocker spring rod 104 in the present embodiment being designed to be longer than the coupling spring rods 103. For example, the rocker spring rod 104 is two to three times as long as the coupling spring rods 103.

Opposite the long side of the first Coriolis element 110, which is placed at a distance from the second Coriolis element 120, the first drive beam 113 extends in the x direction. The two corners of the Coriolis element 110 on this long side are resiliently coupled by a third spring 114 each to the drive beam 113. At its two ends, the drive beam 113 itself is resiliently suspended, in each case with a suspension spring 130 which is respectively attached closer to the side of the first drive beam 113 that faces away from the Coriolis elements 110, 120, on a substrate anchoring point that is firmly connected to the substrate, in such a way that it can move in an oscillating manner in the x direction.

On the side of the first drive beam 113 that faces away from the Coriolis elements 110, 120, a multiplicity of first drive electrode carriers 136, 137 are formed, which extend away from the first drive beam 113 in the direction of the side opposite to the Coriolis elements 110, 120 and extend substantially parallel to the y direction. Each of the first drive electrode carriers 136, 137 carries a multiplicity of first drive electrodes 138, 139, which are extended parallel to the x direction. In the present embodiment, it should be assumed, by way of example, that the drive beam 113, including the drive electrode carriers 136, 137 and the drive electrodes 138, 139, has a constant thickness in the z direction which is greater than the width of the drive electrodes 138, 139 in the y direction and, for example, can be equal to the width of the drive beam 113 in the y direction. Therefore, the individual drive electrodes 138, 139 have a two-dimensional extent parallel to the x and z direction.

In the present embodiment, along the first drive beam 113 there are provided multiple first drive electrode carriers 136, 137, one half of the drive electrode carriers 136 being arranged grouped toward one end of the first drive beam 113, and the other half of the drive electrode carriers 137 being arranged grouped toward the other end of the first drive beam 113. Between the two groups, in the center of the first drive beam 113, there is a section that is free of drive electrode carriers. The respective drive electrodes 138, 139 on the two groups of drive electrode carriers 136, 137 each point toward the side of the nearest end of the first drive beam 113.

The second drive beam 123 extends mirror-symmetrically with respect to the first drive beam 113, opposite the long side of the second Coriolis element 120 which is at a distance from the first Coriolis element 110. The two corners of the second Coriolis element 120 on this long side are resiliently coupled by a fourth spring 124 each to the second drive beam 123. On the side of the second drive beam 123 facing away from the Coriolis elements 110, 120 there are formed a multiplicity of second drive electrode carriers 146, 147, which extend away from the second drive beam 123 in the direction opposite to the Coriolis elements 110, 120. Each second drive electrode carrier 146, 147 carries a multiplicity of first drive electrodes 148, 149. Because of the mirror symmetry of the arrangement comprising the first drive beam 113, the third springs 114 and the first Coriolis element 110 with the arrangement comprising the second drive beam 123, the fourth springs 124 and the second Coriolis element 120, for further details reference made to the above explanations relating to the first drive beam.

In the present embodiment, the two drive beams 113, 123 are each aligned flush with one end of the long sides of the Coriolis elements 110, 120, but on the other hand project beyond the other end, the rotationally oscillating mass 140 being arranged in the further space formed beside the Coriolis elements 110, 120 between the drive beams 113, 123. By using a first and second spring 144, 145, the rotationally oscillating mass 140 is coupled to the first and, respectively, second drive beam 113, 123. In the present embodiment, the rotationally oscillating mass 140 has a rectangular outline, the long sides of which are formed so as to be only slightly longer than the short sides and, each extending in parallel to one of the drive beams 113, 123, are located opposite the latter, forming a gap. This permits a particularly compact design of the yaw rate sensor and utilization of the overall space. In alternative embodiments, the rotationally oscillating mass 140 can be configured to be, for example, square, circular or elliptical.

At an axial position of the rotationally oscillating mass 140 which is located close to the geometric center of the rotationally oscillating mass 140 there is formed a rotationally oscillating mass bearing 157, which supports the rotationally oscillating mass 140 rotatably and in an oscillating manner about a rotational axis of oscillation extending in the z direction through the axial position through a substrate anchoring point 155. It is noted that, in alternative embodiments, the axial position can also be located exactly at the geometric center of the rotationally oscillating mass 140 or another position, provided that the rotationally oscillating mass 140 is able to execute an oscillating rotational movement about the rotational axis of oscillation extending through the axial position. The center of gravity of the rotationally oscillating mass 140 is preferably located at the axial position. The rotationally oscillating mass bearing 157 comprises a substantially central rectangular cut-out 170 in the rotationally oscillating mass 140, within which the substrate anchoring point 155 is located. A first and a second web 156, 166 extend from two opposite edges of the cut-out 170 in the direction of the substrate anchoring point 155, a space remaining respectively between the distal end of each web 156, 166 and the substrate anchoring point 155.

In the areas of the cut-out 170 that remain on both sides of the webs 156, 166, the rotationally oscillating mass bearing 157 has a first and second support element 151, 161, each of which connects the webs 156, 166 and the substrate anchoring point 155 to each other. Each support element 151, 161 comprises a rocker bar 152, 162, which extends beside the webs 156, 166 and the substrate anchoring point 155, parallel to the mutually aligned webs 156, 166, in each case one end of the rocker bar 152, 162 being opposite the end of a web 156, 166. At the two ends of its rocker bar 152, 162, each support element 151, 161 respectively has a support spring rod 153, which resiliently connects the end of the rocker bar 152 over the shortest distance to the associated web 156. Furthermore, each support element 151, 161 has a rocker spring rod 154, 164 which extends from the center of the associated rocker bar 152, 162 that is opposite the substrate anchoring point 155 in each case as far as the substrate anchoring point 155, in order to resiliently connect the relevant rocker bar 152, 162 to the substrate. The individual support elements 151, 161 thus have the shape of an "E" overall, in a similar way to the coupling elements 101, 102, the rocker spring rods 154, 164 and the support spring rods 153, 163 being designed to be equally long in the present embodiment.

During operation of the micromechanical yaw rate sensor 100, the drive electrodes 138, 139, 148, 149 and associated static electrodes (not shown), which are immovable with respect to the substrate, to which the substrate anchoring points 105, 155 also belong, and each mesh with the drive electrodes 138, 139, 148, 149, are energized in a coordinated manner with different, time-alternating electrical voltages, in such a way that the drive beams 113, 123 are set into an anti-parallel drive mode 150, in which they execute an oscillatory movement phase-shifted by 180° with respect to each other along the x axis.

For example, while the drive beams 113 with the drive electrodes 138, 139, 148, 149 are kept at a constant ground potential, first of all an electrical voltage with respect to ground is applied by means of an electronic control device (not shown) to the static electrodes which mesh with the drive electrodes 138 on the first drive beam 113 that point toward the side of the Coriolis elements 110, 120 (upward in FIG. 1), and the static electrodes which mesh with the drive electrodes 149 on the second drive beam 123 that point toward the opposite side of the rotationally oscillating mass 140 (downward in FIG. 1), so that the first drive beam 113 accelerated by the electrostatic forces in the direction pointing upward in FIG. 1, while the second drive beam 123 is accelerated by the electrostatic forces in the direction pointing downward in FIG. 1. The applied voltage is then switched off, whereupon the drive beams 113, 123 are retarded by the restoring force of the suspension springs 130 and are accelerated again in the direction of the initial position.

Subsequently, an electrical voltage with respect to ground is applied to the static electrodes which mesh with the drive electrodes 148 on the second drive beam 123 that point upward in FIG. 1 and the static electrodes which mesh with the drive electrodes 139 on the first drive beam 113 that point downward in FIG. 1, so that the first drive beam 113 is accelerated by the electrostatic forces in the direction pointing downward in FIG. 1, while the second drive beam 123 is accelerated by the electrostatic forces in the direction pointing upward in FIG. 1. The applied voltage is then switched of again, whereupon the drive beams 113, 123 are initially retarded by the restoring force of the suspension springs 130 and are then accelerated in the direction of the initial position.

Here, the above activation can be repeated advantageously with a time period which coincides substantially with the natural frequency of the anti-parallel oscillation mode 150, in which a first drive mass 112 comprising the first drive beam 113, the first drive electrode carriers 136, 137 and the first drive electrodes 138, 139, and a second drive mass 122 comprising the second drive beam 123, the second drive electrode carriers 146, 147 and the second drive electrodes 148, 149, oscillate in anti-phase along the x axis. In this drive mode 150, on account of the coupling via the third springs 114, the first Coriolis element 110 executes an oscillatory movement which is phase-shifted by a constant angle with respect to the first drive mass 112 (e.g. is in phase), while, on account of the coupling via the fourth springs 124, the second Coriolis element executes an oscillatory movement which—e.g. given symmetrical formation and activation as in the present embodiment—is phase-shifted by likewise the constant angle with respect to the second drive mass 122. This means that the first Coriolis element 110 and the second Coriolis element 120 execute an anti-parallel oscillatory movement in the direction parallel to the drive beam, which is additionally stabilized by the mechanical coupling via the coupling elements 101, 102.

In the above anti-parallel drive mode 150, on account of its coupling via the first and second spring 144, 145, the rotationally oscillating mass 140 is caused to make an oscillatory rotational movement about the axis extending in the z direction through the substrate anchoring point 155 of the rotationally oscillating mass bearing 157. Via, firstly, the spring 144, the rotationally oscillating mass 140 and the second spring 145 and, secondly, the third springs 114, the first Coriolis element 110, the coupling elements 101, the second Coriolis element 120 and the fourth springs 124, mechanical coupling results between the oscillatory movements of the first and second drive mass 112, 122, which stabilizes the anti-parallel drive mode 150.

If the yaw rate sensor 100 is rotated about the x axis with continuous execution of the anti-parallel drive mode 150, a torque acts on the rotationally oscillating Mass 140, which deflects the rotationally oscillating mass 140 out of the main extension plane about the tilt axis going through the first and second spring 144, 145, the substrate anchoring point 155 and the rocker spring rods 154, 164 of the support elements 151, 161.

If the yaw rate sensor 100 is rotated about the y axis, forces act on the Coriolis elements 110, 120, which deflect the latter in mutually opposite directions out of the main extension plane. Here, as a result of the rocker bars 102 of the coupling elements 101 tilting about the associated rocker spring rods 104, stabilizing mechanical coupling between the deflections of the two Coriolis elements 110, 120 takes place.

If the yaw rate sensor 100 is rotated about the z axis, forces act on the Coriolis elements 110, 120, which deflect the latter in mutually opposite directions parallel to the y axis. Here, stabilizing mechanical coupling between the deflections of the two Coriolis elements 110, 120 takes place as a result of bending of the coupling spring rods 103. Detection of the deflections of the Coriolis elements 110, 120 and of the rotationally oscillating mass 140 can be carried out in the above cases in each case via capacitance changes on suitably positioned measuring electrodes (not shown).

Figure 2:
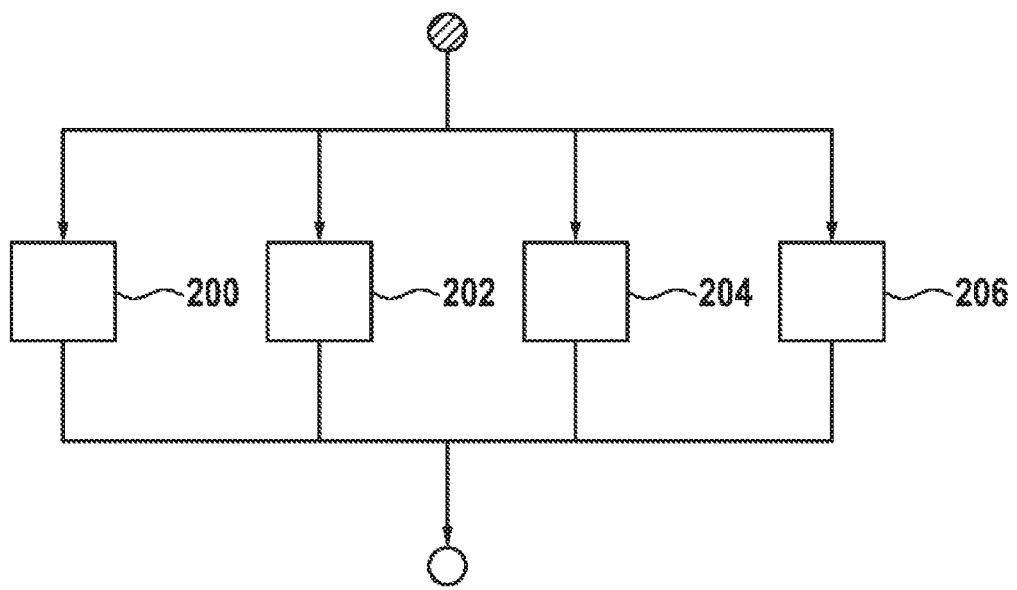
FIG. 2 shows a flowchart of an operating method for a micromechanical yaw rate sensor according to one embodiment.

FIG. 2 shows a flowchart for a method for producing a micromechanical yaw rate sensor having a rotationally oscillating mass, such as the above-described yaw rate sensor 100 from FIG. 1, which comprises the formation of a rotationally oscillating mass bearing for the rotationally oscillating mass.

In steps 200-206, the yaw rate sensor is produced by means of a micromechanical process, which forms different elements of the yaw rate sensor at the same time. In detail, in step 200 the rotationally oscillating mass is formed, while in the steps 202, 204, 206 carried out at the same time as step 200, the rotationally oscillating mass bearing is formed. In step 202, a rocker bar is formed. In step 204, the rocker bar is resiliently connected to a substrate of the yaw rate sensor by means of a rocker spring rod. In step 206, the rocker bar and the rotationally oscillating mass are resiliently connected by means of two support spring rods on opposite sides of the rocker spring rod.

Depending on the exact configuration of the yaw rate sensor, the method comprises the production of further component parts. For example, in the case of the production of the yaw rate sensor 100 from FIG. 1, provision can be made that, in step 200, a first and second drive beam are formed, which are arranged along opposite sides of the rotationally oscillating mass, are coupled to the rotationally oscillating mass via associated springs and carry drive electrodes. For the rotationally oscillating mass bearing, in step 202 a further rocker bar can also be formed, and in step 204 the further rocker bar can be resiliently connected to the substrate by means of an associated further rocker spring rod. In step 206, both the rocker bar and the further rocker bar can be resiliently connected to the rotationally oscillating mass by means of in each case two support spring rods on opposite sides of the relevant rocker spring rod.

Before and after the micromechanical process of steps 200-206, further method steps can be provided. It is noted that, in FIG. 2, the steps 200-206 are illustrated as carried out simultaneously; however in alternative embodiments within the context of a suitable micromechanical or other production method, they can also be carried out, for example, one after another.

The invention claimed is:

1. A micromechanical yaw rate sensor, comprising:
   a substrate defining a main extension plane; and
   a rotationally oscillating mass including a rotationally oscillating mass bearing, the rotationally oscillating mass bearing including:
      a rocker bar;
      a rocker spring rod configured to connect resiliently the rocker bar to the substrate at a substrate anchoring point; and
      two support spring rods configured to connect resiliently the rocker bar to the rotationally oscillating mass on opposite sides of the rocker spring rod,
   wherein the rotationally oscillating mass is configured to be deflected out of the main extension plane about a tilt axis passing through the rocker spring rod and the substrate anchoring point.

2. The yaw rate sensor as claimed in claim 1, wherein the rocker spring rod extends at right angles to the rocker bar.

3. The yaw rate sensor as claimed in claim 1, wherein the two support spring rods are arranged symmetrically on the opposite sides of the rocker spring rod.

4. The yaw rate sensor as claimed in claim 1, wherein the two support spring rods extend parallel to the rocker spring rod.

5. The yaw rate sensor as claimed in claim 1, further comprising:
   a first drive mass arranged beside the rotationally oscillating mass and coupled to the rotationally oscillating mass via a first spring; and
   a second drive mass arranged beside the rotationally oscillating mass and coupled to the rotationally oscillating mass via a second spring;
   wherein the rocker spring rod extends along a connecting straight line between the first and second springs such that the tilt axis passes through the first and second springs.

6. The yaw rate sensor as claimed in claim 1, wherein the rotationally oscillating mass bearing further comprises:
   a further rocker bar;
   a further rocker spring rod configured to connect resiliently the further rocker bar to the substrate at the substrate anchoring point, the tilt axis passing through the further rocker spring rod; and
   two further support spring rods configured to connect resiliently the further rocker bar to the rotationally oscillating mass on opposite sides of the further rocker spring rod.

7. The yaw rate sensor as claimed in claim 6, wherein the rocker spring rod and the further rocker spring rod are configured collinearly.

8. The yaw rate sensor as claimed in claim 6, wherein:
   the rotationally oscillating mass further includes a first projection and a second projection;

the two support spring rods connect the rocker bar to the first and second projections, respectively; and the two further support spring rods connect the further rocker bar to the first and second projections, respectively.

9. The yaw rate sensor as claimed in claim 8, wherein:

the first and second projections are located on mutually opposite sides of a cut-out of the rotationally oscillating mass;

the rocker spring rod connects the rocker bar; and the further rocker spring rod connects the further rocker bar to the substrate between the first and second projections.

10. The yaw rate sensor as claimed in claim 1, wherein the tilt axis is collinear with the rocker spring rod.

11. A method for producing a micromechanical yaw rate sensor including a rotationally oscillating mass and a substrate that defines a main extension plane, the method comprising:

forming a rotationally oscillating mass bearing by:
forming a rocker bar;
resiliently connecting the rocker bar to a substrate anchoring point of the substrate with a rocker spring rod; and
resiliently connecting the rocker bar and the rotationally oscillating mass via two support spring rods on opposite sides of the rocker spring rod,
wherein the rotationally oscillating mass is configured to be deflected out of the main extension plane about a tilt axis passing through the rocker spring rod and the substrate anchoring point.

* * * * *